(12) United States Patent
Hanson et al.

(10) Patent No.: US 8,158,051 B2
(45) Date of Patent: Apr. 17, 2012

(54) VACUUM TRANSFER SEAL

(75) Inventors: Steven F. Hanson, Derby, KS (US);
Jeffrey W. Priest, Rose Hill, KS (US);
Carl R. Fiegenbaum, Rose Hill, KS (US); Kelvin D. Nguyen, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 635 days.

(21) Appl. No.: 12/116,691

(22) Filed: May 7, 2008

(65) Prior Publication Data
US 2009/0278319 A1 Nov. 12, 2009

(51) Int. Cl.
*B32B 38/18* (2006.01)
(52) U.S. Cl. ........ 264/511; 264/553; 264/571; 264/101; 264/102; 156/230; 156/249; 156/285; 156/286
(58) Field of Classification Search .................. 156/230, 156/285, 381, 382, 286, 249; 264/511, 553, 264/571, 101, 102
See application file for complete search history.

(56) References Cited

U.S. PATENT DOCUMENTS

| | | | |
|---|---|---|---|
| 3,666,600 A | 5/1972 | Yoshino | |
| 3,912,542 A | 10/1975 | Hirano et al. | |
| 4,287,015 A | 9/1981 | Danner, Jr. | |
| 4,664,737 A | 5/1987 | Schlosstein | |
| 4,681,651 A * | 7/1987 | Brozovic et al. | 156/382 |
| 4,894,102 A | 1/1990 | Halls et al. | |
| 5,648,109 A * | 7/1997 | Gutowski et al. | 425/504 |
| 5,958,166 A * | 9/1999 | Walters et al. | 156/94 |
| 6,168,358 B1 | 1/2001 | Engwall et al. | |
| 6,759,002 B1 | 7/2004 | Engwall et al. | |

* cited by examiner

*Primary Examiner* — Christopher Schatz
(74) *Attorney, Agent, or Firm* — Hovey Williams LLP

(57) ABSTRACT

An intermediate sealing element and method for unsealing a vacuum membrane from one tool surface and transferring it to another tool surface without damaging the vacuum membrane. The intermediate sealing element forms a continuous path around the periphery of a vacuum membrane and is sealed directly to one or more vacuum membranes and a tool surface using any means known in the art to create an airtight seal between two surfaces. The intermediate sealing element is able to withstand high temperatures and high pressure without altering its structural characteristics. Because of its durability, the intermediate sealing element can be removed from the tool surface without tearing or elongating, subsequently allowing the vacuum membranes to be detached from the tool surface without tearing or elongating.

22 Claims, 3 Drawing Sheets

VACUUM TRANSFER SEAL

BACKGROUND

1. Field

The present invention relates to sealing a vacuum membrane to a tool surface, such as in the manufacturing of composite structures. More particularly, the present invention relates to unsealing and transferring a vacuum membrane from a tool surface without damaging the vacuum membrane.

2. Related Art

Vacuum compression is used in manufacturing processes to compress various types of material in preparation for hardening or curing. For example, to form a composite part of an aircraft, composite part laminate material may be laid onto a tool surface, such as a lay-up tool, and covered with a vacuum membrane. The vacuum membrane is sealed to the tool surface around the entire periphery of the vacuum membrane and air between the vacuum membrane and the tool surface is removed, thereby inducing a pressure differential on the laminate and compressing the vacuum membrane toward the surface. The compressed material is then cured to become a strong, light-weight part.

Some manufacturing processes require moving the compressed material from one tool surface to another tool surface prior to curing. In this situation, two vacuum membranes may be used, wherein one vacuum membrane is placed under the composite part laminate and another is laid over the composite part laminate. Both vacuum membranes are sealed to each other and to the tool surface around the entire periphery of the vacuum membranes. Once the air is removed from between the two vacuum membranes, the vacuum membranes are removed from a first tool surface and transferred to a second tool surface prior to cure. However, because the vacuum membrane is typically very thin, for example, only two to three thousandths of an inch thick, unsealing and removing the vacuum membrane from the tool surface may damage or wrinkle the vacuum membrane. Damaging either of the vacuum membranes can allow air to seep in between the vacuum membranes.

Accordingly, there is a need for an improved method of sealing a vacuum membrane to a tool surface that does not suffer from the problems and limitations of the prior art.

SUMMARY

The present technology provides an intermediate sealing element and method for unsealing a vacuum membrane from one tool surface and transferring it to another tool surface without damaging the vacuum membrane. The intermediate sealing element forms a continuous path around the periphery of a vacuum membrane and is sealed directly to one or more vacuum membranes and a tool surface using any means known in the art to create an airtight seal between two surfaces.

In various embodiments of the invention, the intermediate sealing element is operable to withstand a temperature of 800° F. and a pressure of 250 psi without compromising its structural integrity. In other various embodiments of the invention, the intermediate sealing element is operable to withstand a temperature of 350° F. and a pressure of 100 psi without compromising its structural integrity. Because of its durability, the intermediate sealing element can be removed from the tool surface without tearing or elongating, thereby facilitating the detachment of one or more vacuum membranes from the tool surface without tearing or elongating.

A method of using the intermediate sealing element comprises sealing a first side of the intermediate sealing element to a first tool surface; sealing the first side or a second side of the intermediate sealing element to a first vacuum membrane, thereby creating an airtight seal between the first tool surface and the first vacuum membrane; and unsealing the first side of the intermediate sealing element from the first tool surface to relocate the first vacuum membrane. The method may further comprise sealing a second vacuum membrane to the second side of the intermediate sealing element.

In various embodiments of the invention, the method may comprise disposing a material between the first vacuum membrane and the second vacuum membrane, then urging the first vacuum membrane toward the first tool surface by a differential pressure. The vacuum force may also urge the second vacuum membrane toward the first tool surface, thereby compressing the material disposed therebetween.

In other various embodiments of the invention, the method may comprise sealing the second side of the intermediate sealing element to a second tool surface.

These and other important aspects of the present invention are described more fully in the detailed description below.

BRIEF DESCRIPTION OF THE DRAWINGS

An embodiment of the present invention is described in detail below with reference to the attached drawing figures, wherein.

DETAILED DESCRIPTION

Figure 1:
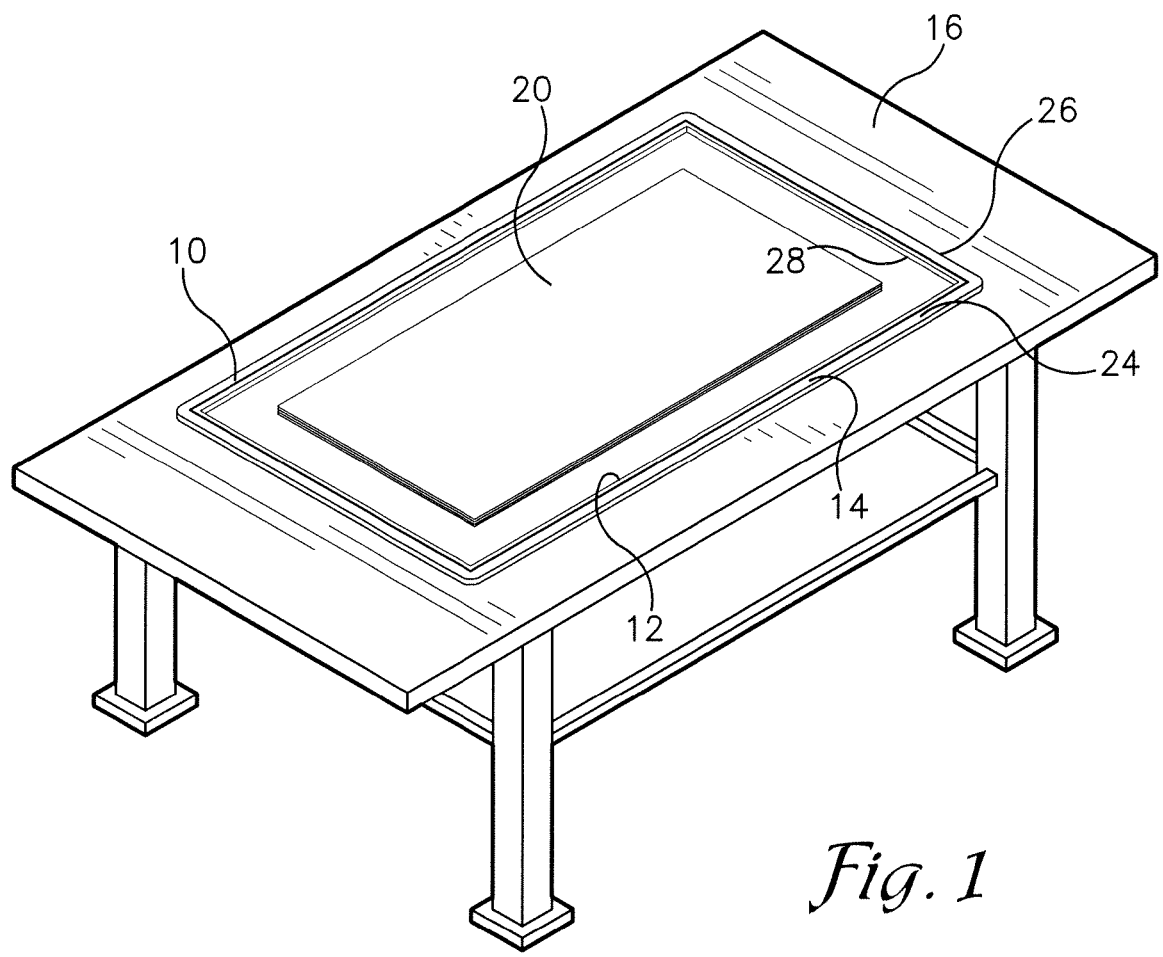
FIG. 1 is an isometric view of an intermediate sealing element disposed on a first tool surface and constructed in accordance with a first embodiment of the present invention.

FIG. 1 illustrates an intermediate sealing element 10 constructed in accordance with an embodiment of the present invention. The intermediate sealing element 10 may be used as an intermediary between two or more of a first vacuum membrane 12, a second vacuum membrane 14, a first tool surface 16, and a second tool surface 18 (see FIG. 4). The intermediate sealing element 10 is particularly suited to facilitate transferring a composite part laminate 20, compressed between the vacuum membranes 12,14, from the first tool surface 16 to the second tool surface 18 in the manufacture of composite parts for aircraft or other applications.

The vacuum membranes 12,14 may be any substantially malleable, air-tight material. The first tool surface 16 and the second tool surface 18 may be the surface of any mold, table, lay-up tool, mandrel, or cure tool known in the art or used in manufacturing processes involving sealing vacuum membranes to a surface.

The intermediate sealing element 10 may be composed of any substantially durable material. For example, the intermediate sealing element 10 may be composed of metal, plastic, or an elastomer, such as rubber or fluoroelastomer. In various embodiments of the invention, the intermediate sealing element 10 may retain its structural integrity and usefulness when exposed to temperatures as high as about 800° F. and when exposed to pressures as high as 250 psi. In various other embodiment of the invention, temperatures less than or equal to about 350° F. and pressure less than or equal to about 100 psi will not alter the structural characteristics of the intermediate sealing element 10 or otherwise diminish the capacity of the element 10 to form an airtight seal with a surface or vacuum membrane and to be transferred from a first surface or location to a second surface or location. Specifically, for example, a temperature equal to or less than about 350° F. will not cause the intermediate sealing element 10 to melt. However, the intermediate seal may be composed of materials with other structural temperature and pressure thresholds according to the particular requirements of its particular application.

In various embodiments, the intermediate sealing element 10 is more durable than the vacuum membranes 12,14 and is more resistant to structural damage and structural alteration caused by high temperatures and high pressure. Specifically, the intermediate sealing element 10 may be thicker and/or more rigid than the vacuum membranes 12,14. For example, the intermediate sealing element 10 may be between 0.0075 inches and 0.25 inches thick, or more specifically between 0.009 inches and 0.02 inches thick. The vacuum membranes 12,14 may each be between 0.0005 inches and 0.005 inches thick, or more specifically between 0.001 inches and 0.004 inches thick. However, the intermediate sealing element 10 may be any size or thickness required by a given application and may be used with vacuum membranes of any size and thickness.

Figure 2:
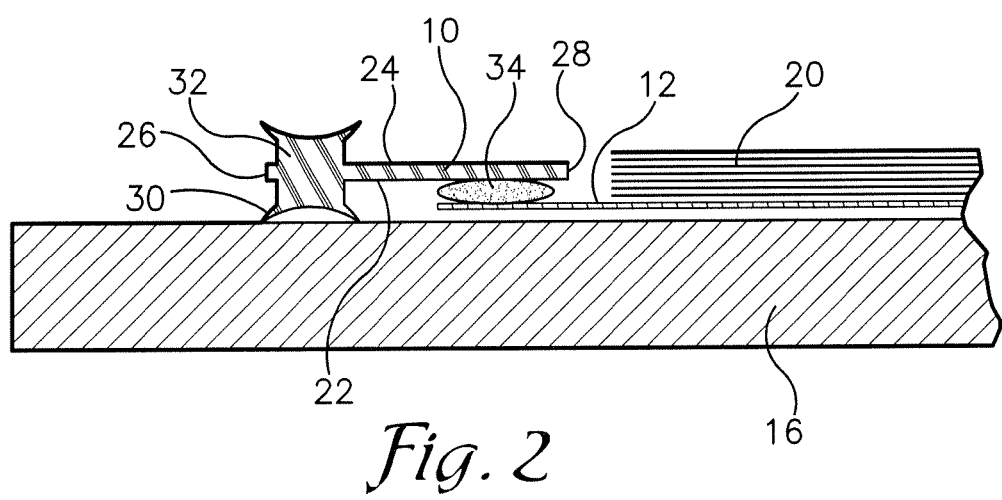
FIG. 2 is a cross-sectional view of the intermediate sealing element of FIG. 1, wherein a first face of the intermediate sealing element is sealed to the first tool surface and a first vacuum membrane.

Referring also to FIG. 2, the intermediate sealing element 10 may have a first face 22, a second face 24, an outer edge 26, an inner edge 28, and may form a continuous path along the periphery of the first vacuum membrane 12. The inner edge 28 of the intermediate sealing element 10 may at least partially overlap the vacuum membranes 12,14 so that the vacuum membranes 12,14 can be sealed to the intermediate sealing element 10. The continuous path may be any shape required by a given application. For instance, the intermediate sealing element 10 may form a continuous square, as illustrated in FIG. 1. However, the intermediate sealing element 10 may form a continuous path of any shape or size required to make contact with the entire periphery of the first vacuum membrane 12. Vacuum membranes may also vary in size and shape depending on the application.

The intermediate sealing element 10 may be sealed to the tool surfaces 16,18 and the vacuum membranes 12,14 by any sealing compound, lip seal, rubber vacuum seal, or mechanical seal known in the art for creating an airtight seal between two surfaces. For example, as illustrated in FIG. 2, rubber vacuum seals 30,32 may be attached to each side of the intermediate sealing element 10, thereby allowing a seal to form between one of the rubber vacuum seals 30,32 and either the first tool surface 16 or the second tool surface 18 by means of vacuum force or positive pressure. Alternatively, various types of sealant tape 34 may be used to form a seal between the intermediate sealing element 10 and at least one of the first tool surface 16, the second tool surface 18, the first vacuum membrane 12, and the second vacuum membrane 14, as illustrated in FIGS. 2-7.

Figure 3:
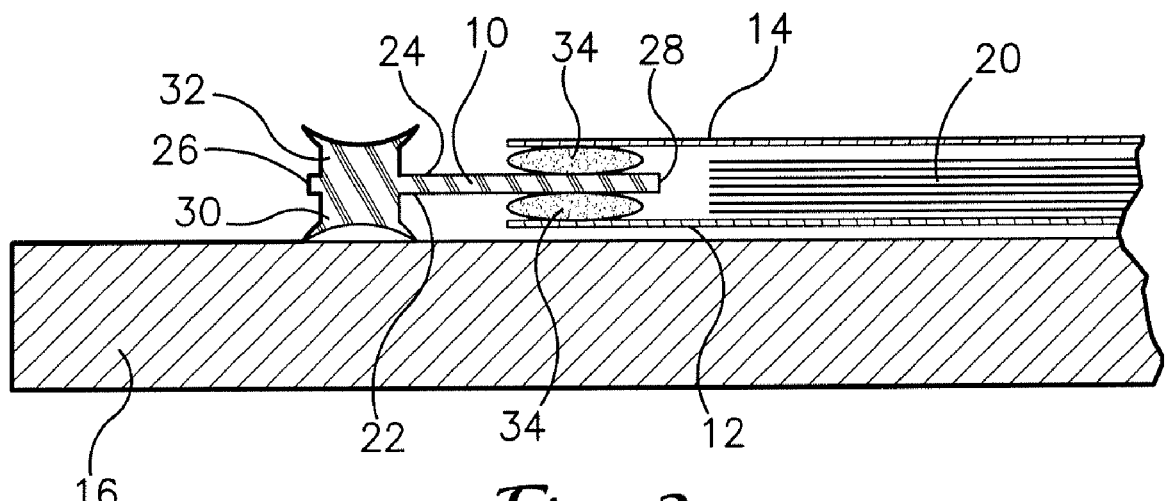
FIG. 3 is a cross-sectional view of the intermediate sealing element of FIG. 2, wherein a second face of the intermediate sealing element is sealed to a second vacuum membrane.
Figure 4:
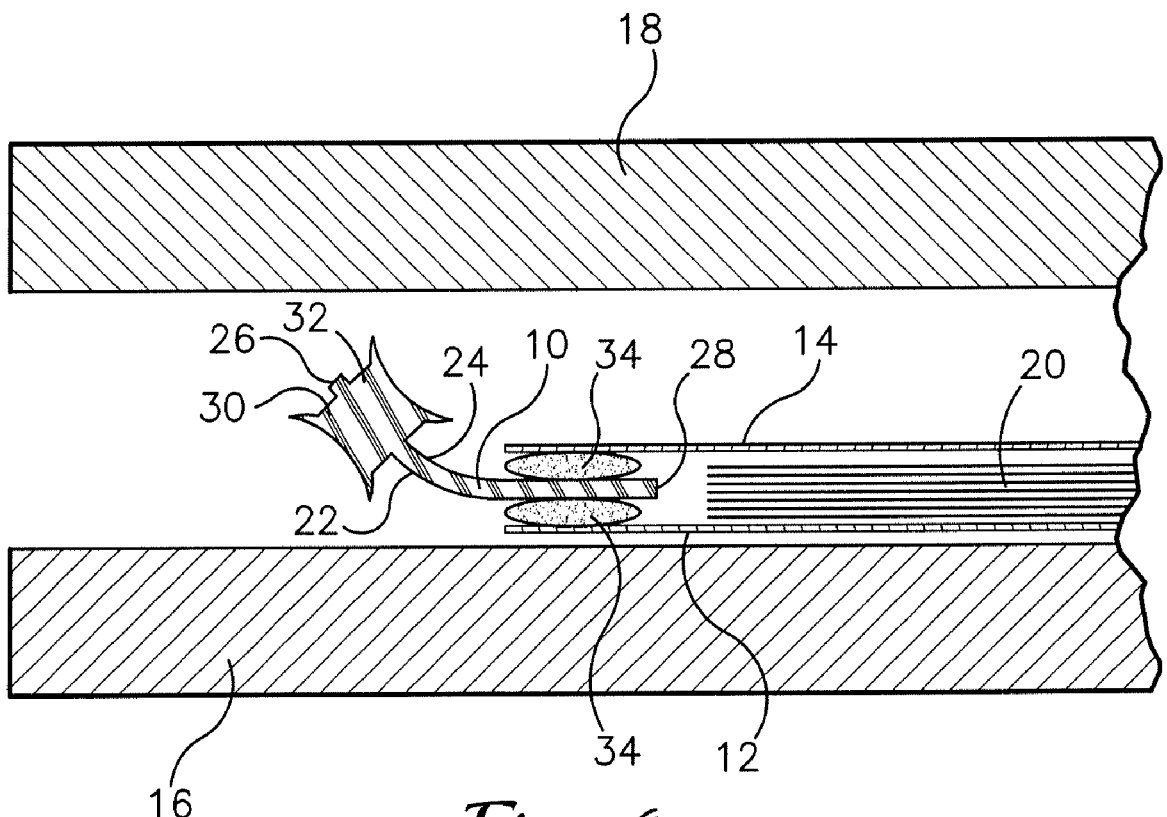
FIG. 4 is a cross-sectional view of the intermediate sealing element of FIG. 3, wherein the intermediate sealing element is unsealed from the first tool surface in preparation for sealing to a second tool surface.

As illustrated in FIGS. 2-5, a method of using the intermediate sealing element 10 comprises sealing the first face 22 of the intermediate sealing element 10 to the first tool surface 16 and sealing the first face 22 or the second face 24 of the intermediate sealing element 10 to the first vacuum membrane 12, thereby creating an airtight seal between the first tool surface 16 and the first vacuum membrane 12. The method may further comprise the step of unsealing the first face 22 of the intermediate sealing element 10 from the first tool surface 16 to relocate the first vacuum membrane 16, as illustrated in FIG. 4.

Figure 5:
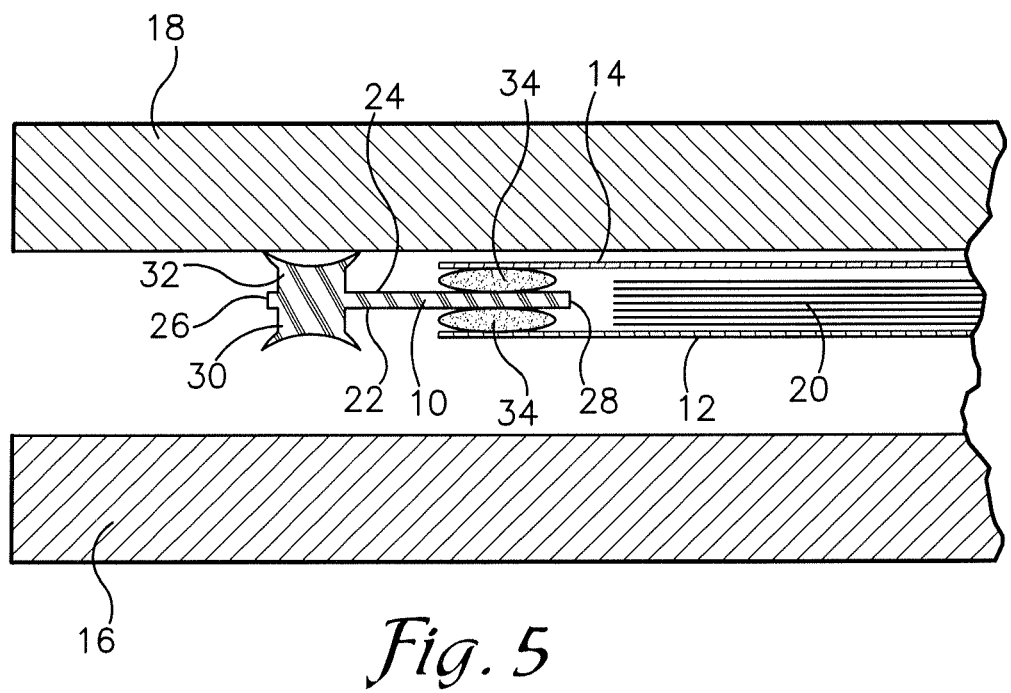
FIG. 5 is a cross-sectional view of the intermediate sealing element of FIG. 4, wherein the second face of the intermediate sealing element is sealed to the second tool surface.

In various embodiments of the invention, the method may further comprise sealing the second vacuum membrane 14 to the second face 24 of the intermediate sealing element 10, as illustrated in FIG. 5. The method may also comprise sealing the second face 24 of the intermediate sealing element 10 to the second tool surface 18. The second face 24 of the intermediate sealing element 10 may be sealed to the second tool surface 18 either before or after unsealing the first face 22 of the intermediate sealing element 10 from the first tool surface 16.

As illustrated in FIG. 3, the method may comprise disposing a material, such as composite part laminate 20, between the first vacuum membrane 12 and the second vacuum membrane 14, then urging the first vacuum membrane 12 toward the first tool surface 16 by a differential pressure. The differential pressure may also urge the second vacuum membrane 14 toward the first tool surface 16, thereby compressing the composite part laminate 20 disposed therebetween. Alternatively, in various embodiments of the invention, any material of sufficient size and weight such that it would not be removed from between the two vacuum membranes 12,14 by a pressure differential when air is removed from between the vacuum membranes 12,14 may be substituted for the composite part laminate 20.

More specifically, in one embodiment of the invention, the first tool surface 16 is sealed to the first face 22 of the intermediate sealing element 10 near the outer edge 26 of the intermediate sealing element 10, and the first vacuum membrane is sealed to the first face 22 of the intermediate sealing element near the inner edge 28 of the intermediate sealing element 10, as illustrated in FIG. 2. Then a composite part laminate 20 or a suitable alternative, as described above, is laid on top of the first vacuum membrane 12, and the second vacuum membrane 14 is sealed to the second face 24 of the intermediate sealing element 10 near the inner edge 28 of the intermediate sealing element 10, as illustrated in FIG. 3. Air is then removed from between the first and second vacuum membranes 12,14 using vacuum means known in the art, thereby urging the first and second vacuum membranes 12,14 toward each other and toward the first tool surface 16.

In one embodiment of the invention, a thin vacuum distribution media (not shown) may be disposed between the first vacuum membrane 12 and the first tool surface 16 to prevent the first vacuum membrane 12 from sealing off against the first tool surface 16, as the first vacuum membrane 12 is pulled down against the first tool surface 16 by a pressure differential. A pressure differential may be created, for example, by removing air from between the first vacuum membrane 12 and the first tool surface 16. The vacuum distribution media may be, for example, fiberglass, and keeps the vacuum membranes 12,14 tight and smooth against the first tool surface 16. The vacuum distribution media also allows the first vacuum membrane 12 to be more easily peeled away from the first tool surface 16 for transfer to another location.

Once the air has been removed from between the vacuum membranes 12,14, the outer edge 26 of the intermediate sealing element 10 may be unsealed from the first tool surface 16, as illustrated in FIG. 4, while remaining sealed to the vacuum membranes 12,14. This allows the vacuum membranes 12,14 and the composite laminate part 20 to remain sealed and compressed during transfer to the second tool surface 18.

In one embodiment of the invention, the second tool surface 18 may be moved toward the first tool surface 16, such that the intermediate sealing element 10, vacuum membranes 12,14, and composite laminate part 20 require little or no lifting to be transferred from one surface to the other. As illustrated in FIG. 5, once the intermediate sealing element 10 is unsealed from the first tool surface 16, the second face 24 of the intermediate sealing element 10 may be sealed to the second tool surface 18 near the outer edge 26 of the intermediate sealing element. Then heat may then be applied to cure the compressed composite laminate part 20.

Figure 6:
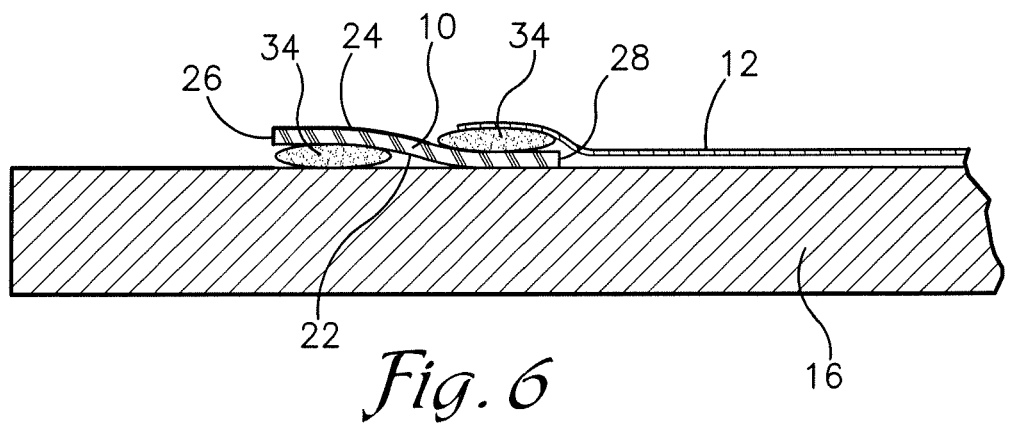
FIG. 6 is a cross-sectional view of the intermediate sealing element constructed in accordance with a second embodiment of the present invention, wherein the first vacuum membrane is sealed to the second face of the intermediate sealing element.
Figure 7:
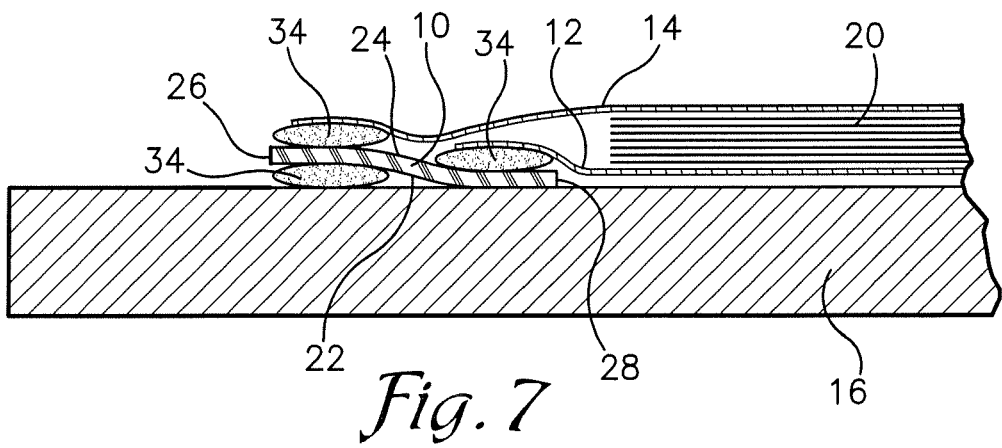
FIG. 7 is a cross-sectional view of the intermediate sealing element of FIG. 6, wherein the second vacuum membrane is sealed to the second face of the intermediate sealing element.

In an alternative embodiment of the invention, illustrated in FIGS. 6-7, the first vacuum membrane 12 may be sealed to the second face 24 of the intermediate sealing element 10 near the inner edge 28 of the intermediate sealing element 10, and the second vacuum membrane 14 may be sealed to the second face 24 of the intermediate sealing element 10 near the outer edge 28 of the intermediate sealing element 10.

Although the invention has been described with reference to the preferred embodiments illustrated in the attached drawings, it is noted that equivalents may be employed and substitutions made herein without departing from the scope of the invention as recited in the claims. It will be appreciated, for example, that the transferring of vacuum sealed membranes from one location to another may apply to other manufacturing processes other than the manufacturing of composite parts for aircraft and the like.

Having thus described a preferred embodiment of the invention, what is claimed as new and desired to be protected by Letters Patent includes the following:

1. A method of sealing and transferring a vacuum membrane, comprising:
    sealing a first side of an intermediate sealing element to a first tool surface;
    sealing at least one of the first side and a second side of the intermediate sealing element to a first vacuum membrane, thereby creating an airtight seal between the first tool surface and the first vacuum membrane;
    unsealing the first side of the intermediate sealing element from the first tool surface to relocate the first vacuum membrane;
    transferring the intermediate sealing element sealed to the first vacuum membrane to a second tool surface; and
    sealing the intermediate sealing element to the second tool surface,
    wherein the intermediate sealing element is able to withstand a temperature of 800° F. and a pressure of 250 psi.

2. The method of claim 1, wherein the intermediate sealing element is made of at least one of an elastomer, plastic, or metal.

3. The method of claim 1, further comprising the step of sealing a second vacuum membrane to the second side of the intermediate sealing element.

4. The method of claim 3, wherein a material is disposed between the first vacuum membrane and the second vacuum membrane.

5. The method of claim 1, further comprising urging the first vacuum membrane toward the first tool surface by a differential pressure.

6. The method of claim 1, wherein the intermediate sealing element is more durable than the first vacuum membrane.

7. The method of claim 1, wherein the intermediate sealing element is shaped such that it forms a continuous frame around the periphery of the vacuum membrane, with a periphery of the vacuum membrane partially overlapping the intermediate sealing element.

8. The method of claim 4, wherein the material disposed between the first vacuum membrane and the second vacuum membrane is composite part laminate.

9. The method of claim 1, wherein at least one of a lip seal, and a rubber vacuum seal seals and secures the intermediate sealing element to the first tool surface and the first vacuum membrane.

10. The method of claim 1, further comprising sealing the second side of the intermediate sealing element to the second tool surface.

11. The method of claim 1, wherein the intermediate sealing element is between 0.0075 inches and 0.25 inches thick and the first vacuum membrane is between 0.0005 inches and 0.005 inches thick.

12. The method of claim 1, wherein the intermediate sealing element is between 0.009 inches and 0.02 inches thick and the first vacuum membrane is between 0.001 inches and 0.004 inches thick.

13. A method of sealing and transferring a vacuum membrane, comprising:
    sealing a first portion of a first side of an intermediate sealing element against a first tool surface;
    sealing a second portion of the first side of the intermediate sealing element against a first vacuum membrane along the entire periphery of the first vacuum membrane, wherein the second portion of the first side is proximate an inner edge of the intermediate sealing element and the first portion of the first side is proximate an outer edge of the intermediate sealing element;
    sealing a second side of the intermediate sealing element to a second vacuum membrane, thereby creating an airtight seal between the first and second vacuum membranes; and
    sealing the second side of the intermediate sealing element to a second tool surface.

14. The method of claim 13, wherein the intermediate sealing element is at least one of an elastomer, plastic, or metal.

15. The method of claim 13, wherein the intermediate sealing element is able to withstand a temperature of 350° F. and a pressure of 100 psi.

16. The method of claim 13, wherein the intermediate sealing element is able to withstand a temperature of 800° F. and a pressure of 250 psi.

17. The method of claim 13, wherein a material is disposed between the first vacuum membrane and the second vacuum membrane.

18. The method of claim 17, further comprising compressing the first and second vacuum membranes toward the first tool surface by a pressure differential.

19. The method of claim 13, wherein the intermediate sealing element is more durable than the first vacuum membrane.

20. The method of claim 13, wherein the intermediate sealing element is shaped such that it forms a continuous frame around the periphery of the vacuum membrane, with a periphery of the vacuum membrane partially overlapping the intermediate sealing element.

21. The method of claim 13, further comprising the step of unsealing the intermediate sealing element from the first tool surface prior to sealing the second side of the intermediate sealing element to a second tool surface.

22. A method of sealing and transferring a vacuum membrane, comprising:

sealing a first side of an intermediate sealing element near an outer peripheral edge of the intermediate sealing element to a first tool surface, the intermediate sealing element defining a continuous path along the first tool surface;

sealing the first side of the intermediate sealing element near an inner peripheral edge of the intermediate sealing element to a first vacuum membrane along the entire periphery of the first vacuum membrane;

laying composite part laminate over the first vacuum membrane;

laying a second vacuum membrane over the composite part laminate;

sealing a second side of the intermediate sealing element near the outer peripheral edge of the intermediate sealing element to the second vacuum membrane, thereby creating an airtight seal between the first and second vacuum membranes;

removing air from between the first vacuum membrane and the tool surface;

removing air from between the second vacuum membrane and the first vacuum membrane;

unsealing the intermediate sealing element still sealed to the first vacuum membrane and the second vacuum membrane from the first tool surface;

sealing the second side of the intermediate sealing element to a second tool surface after the intermediate sealing element is unsealed from the first tool surface; and curing the composite part laminate between the first vacuum membrane and the second vacuum membrane after the intermediate sealing element is sealed to the second tool surface;

wherein the intermediate sealing element is at least one of an elastomer, plastic, or metal and is able to withstand a temperature of 800° F. and a pressure of 250 psi, wherein the intermediate sealing element is thicker and more durable than the first and second vacuum membranes.

* * * * *